March 23, 1926.                E. L. ROOT                1,577,873
                          ARTIFICIAL TREE TRUNK
                           Filed Jan. 26, 1925
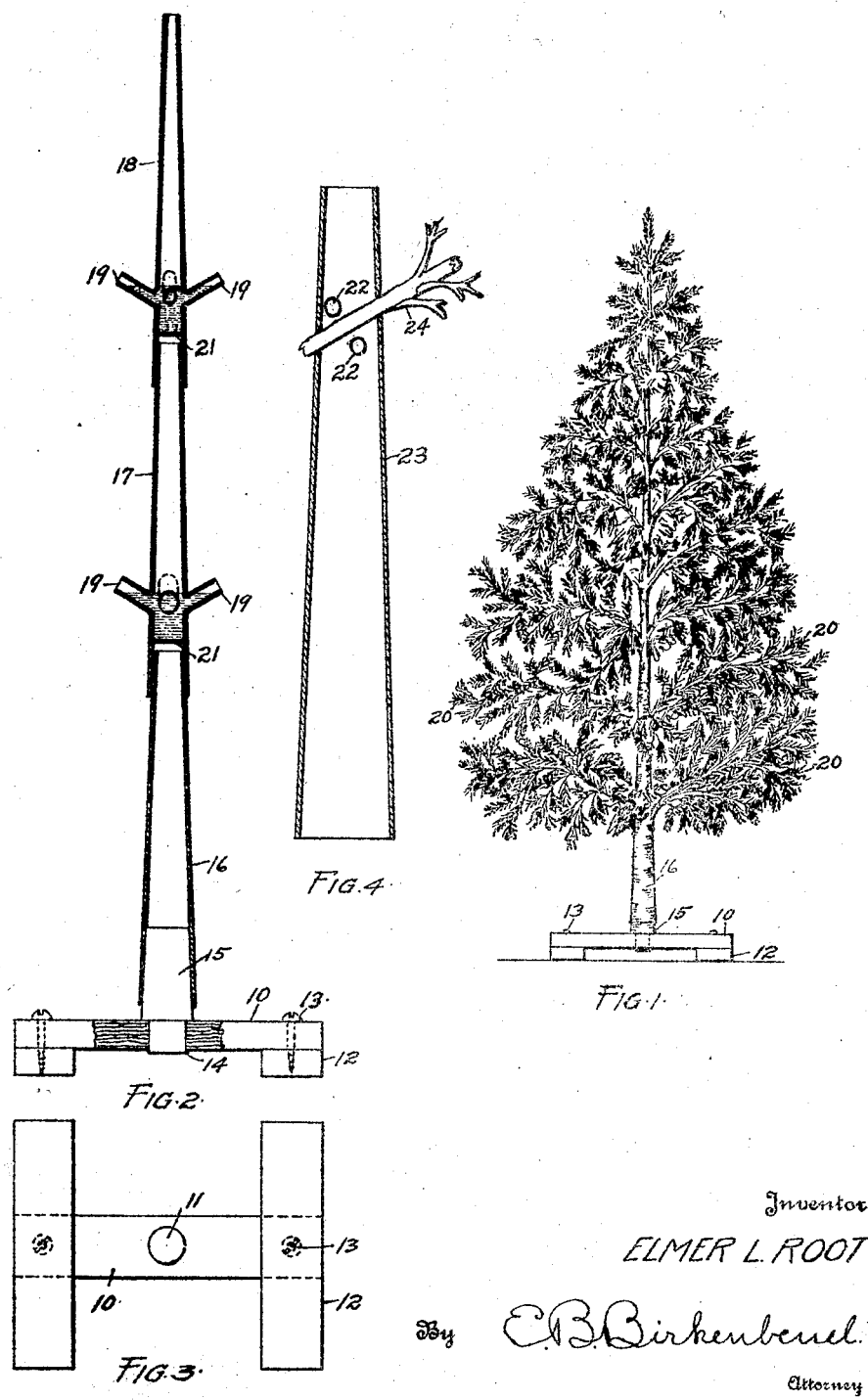
Inventor
ELMER L. ROOT
By E. B. Birkenbeul
Attorney Patented Mar. 23, 1926.

1,577,873

UNITED STATES PATENT OFFICE.

ELMER L. ROOT, OF MOSIER, OREGON.

ARTIFICIAL TREE TRUNK.

Application filed January 26, 1925. Serial No. 4,742.

*To all whom it may concern:*

Be it hereby known that I, ELMER L. ROOT, a citizen of the United States, and a resident of Mosier, in the county of Wasco and State of Oregon, have invented a new and useful Artificial Tree Trunk, of which the following is a specification.

This invention relates generally to the art of decoration, and particularly to the formation of Christmas trees from small branches.

The first object of this invention is to eliminate the waste occasioned each year by cutting down young evergreen trees for Christmas trees and decorative purposes.

The second object is to make Christmas trees available in places where the use of trees is almost prohibitive, as, for example, in our prairie States.

The third object is to reduce the shipping and storing space required for each tree, as material for a full size tree can be packed or shipped in a space no longer than its longest branch.

The fourth object is to so construct the tree that its height may be varied to suit the room in which it is used or the purse of the purchaser.

The fifth object is to so construct the tree that the foliage may be preserved for a longer period of time than is possible when the entire tree is used.

These, and other objects, will become more apparent from the specification following as illustrated in the accompanying drawing, in which:

Figure 1 is a side elevation of a completed tree. Figure 2 is a sectional elevation of several units of the tree trunk and of the base on which they are mounted. Figure 3 is a bottom view of the folding base member. Figure 4 is a section through a modified form of a trunk unit.

Similar numbers of reference refer to the same parts throughout the several views.

Referring in detail to the drawing, the device is mounted on a base 10 which is provided with a central hole 11 and folding feet 12 which are attached by means of the wood screws 13. In the hole 11 is placed a shank 14 of a tapered plug 15 which is preferably supplied in two or three sizes.

The lowermost unit 16 of the trunk is mounted on the tapering plug 15. The unit 16 is preferably of light sheet metal. On the top of the unit 16 is fitted a unit 17, on top of which is fitted a third unit 18, and so on. Each succeeding unit grows smaller after the fashion of a tree.

On the sides of the various units are secured the tubular pockets 19 for the branches 20, which naturally would be selected and graduated for size as they neared the top of the tree.

In the unit 17 is illustrated a bottom 21 adapted to hold water for the branches 20.

In Figure 4 is illustrated a cheaper form of the device in which holes 22 are formed in the sides of the unit 23 to receive the ends of the branches 24.

It must be understood that the height of the tree can be varied at will, it being only necessary to insert the right size plug 15 in the lowermost unit.

The branch holders may be of sheet metal, or cast, or merely perforations, as suggested, without departing from the spirit of this invention.

For the tip of the tree a suitable branch is merely inserted into the uppermost end of the top unit.

It is preferable, of course, to finish the material in the units of the trunk in a manner resembling the bark of trees commonly used for Christmas trees.

I claim:

1. In an artificial tree, the combination of a folding base member having a hole formed therein, a shouldered plug fitted into said hole and having its upper end tapering; a tapering tubular shell resembling a tree trunk fitted on to said tapering plug; a plurality of tapering shells whose ends telescope together and unite to form a tapering trunk with said first mentioned shell; and means for attaching natural branches to said trunk.

2. In an artificial tree, the combination of a plurality of tapering tubular shells of different diameters adapted to have their ends telescope in a manner to form a rigid tapering member resembling a tree trunk; a shouldered tapering plug having its tapering end adapted to fit snugly into the larger end of said trunk; a base consisting of a frame having a hole formed therein adapted to receive the shouldered end of said plug; folding feet members on the under side of said frame; and tubular pockets formed around said trunk at varying heights adapted to hold natural branches in the same relation to said trunk as they might have held to their parent tree.

ELMER L. ROOT.